H. M. KESSLER.
MILK TREATING DEVICE.
APPLICATION FILED OCT. 23, 1916.
1,321,106.
Patented Nov. 11, 1919.
2 SHEETS—SHEET 1.
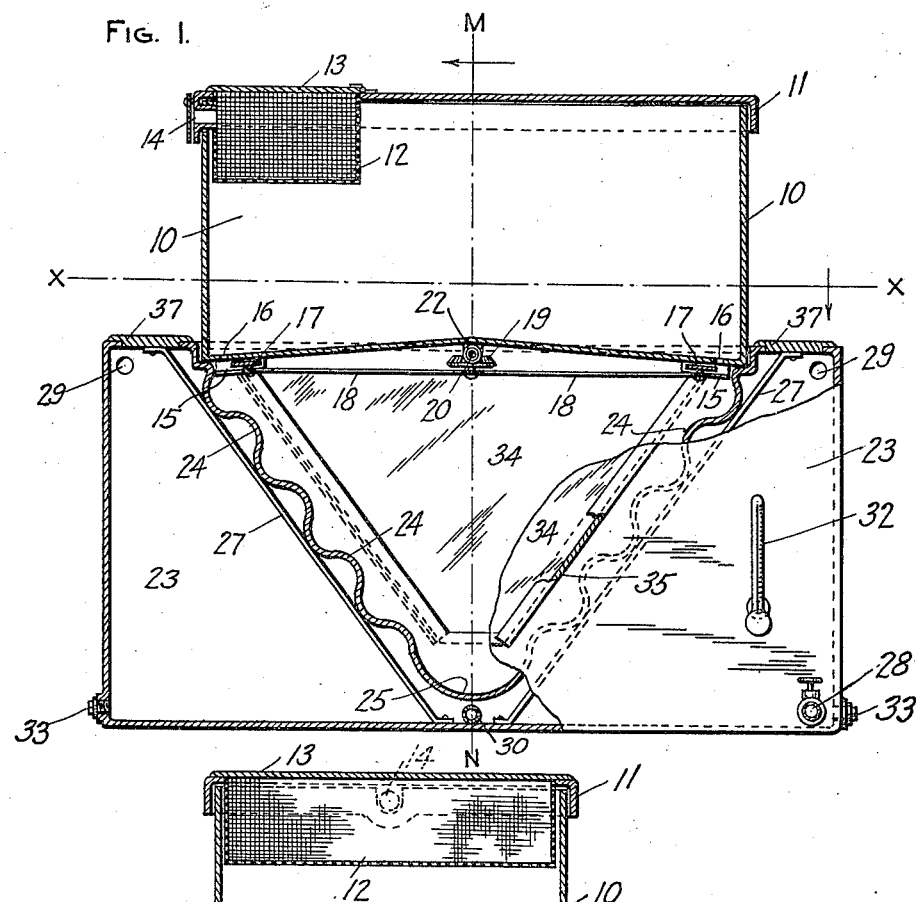
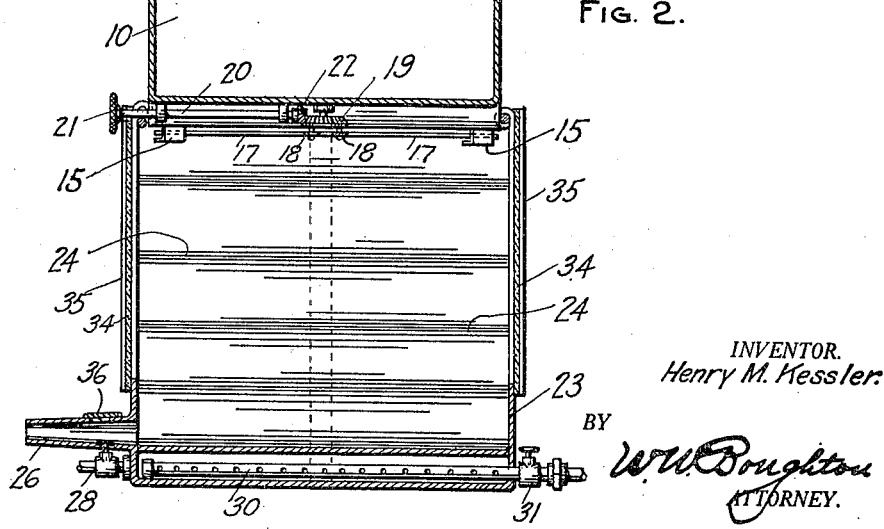
INVENTOR.
Henry M. Kessler.
BY
W. W. Boughton
ATTORNEY.

H. M. KESSLER.
MILK TREATING DEVICE.
APPLICATION FILED OCT. 23, 1916.
1,321,106.
Patented Nov. 11, 1919.
2 SHEETS—SHEET 2.
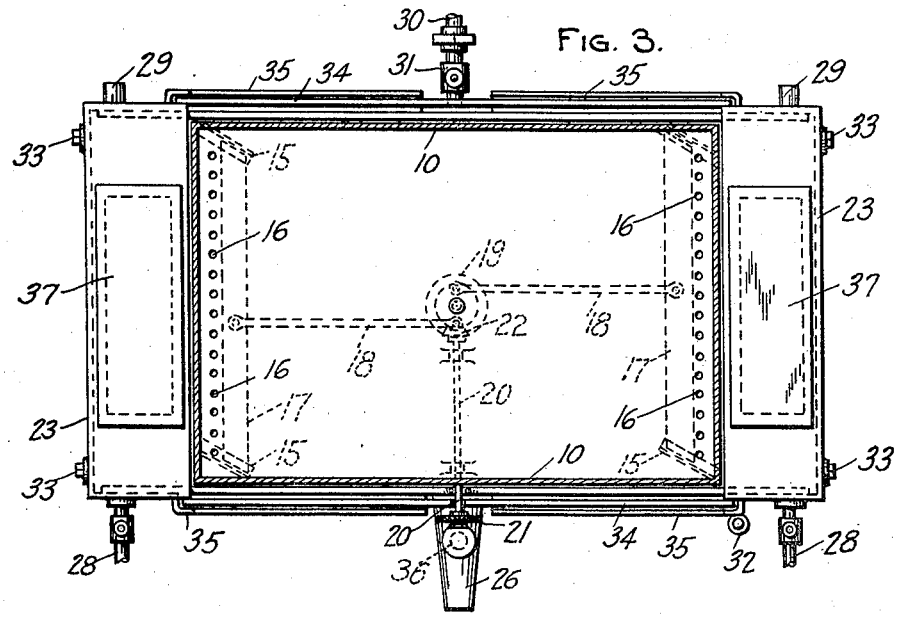
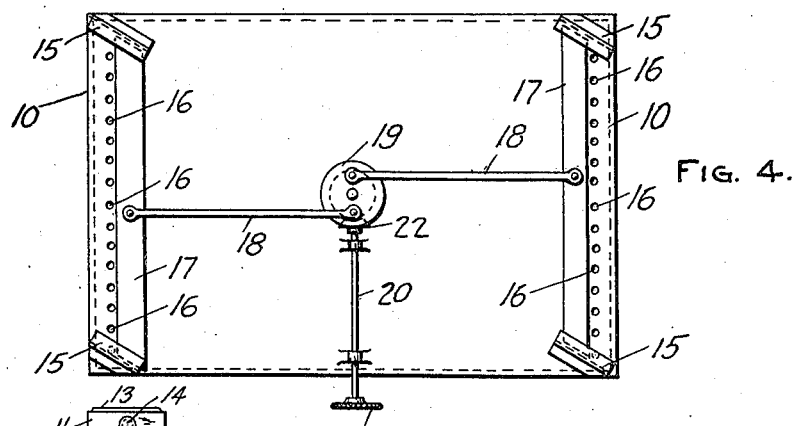
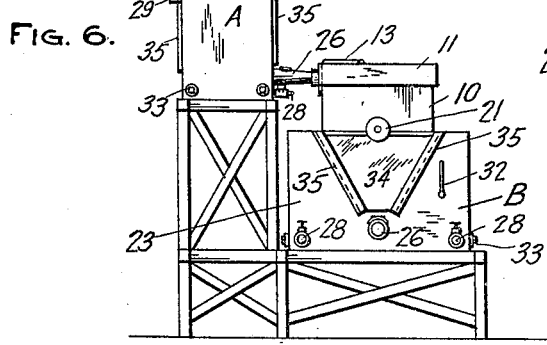
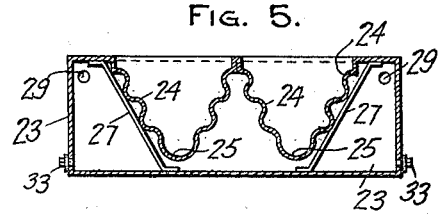
INVENTOR.
Henry M. Kessler.
BY
W. W. Boughton
ATTORNEY.

UNITED STATES PATENT OFFICE.

HENRY M. KESSLER, OF DENVER, COLORADO, ASSIGNOR OF ONE-THIRD TO BERT A. SEBRING, OF PUEBLO, COLORADO.

MILK-TREATING DEVICE.

1,321,106.  Specification of Letters Patent.  Patented Nov. 11, 1919.

Application filed October 23, 1916. Serial No. 127,162.

*To all whom it may concern:*

Be it known that I, HENRY M. KESSLER, a citizen of the United States, and a resident of Denver, in the county of Denver and State of Colorado, have invented a certain new and useful Improvement in Milk-Treating Devices, of which the following is a full, clear, and exact description.

My invention is an improvement in milk treating apparatus and its principal object is the provision of a simple and inexpensive device in which milk may be treated in a chamber closed against the admission of insects or dust. A further object of my invention is the provision of a device of the character described which may be used either for cooling or for pasteurizing milk, as may be desired. Still further objects of my invention reside in the provision of means whereby the treatment of the milk may be observed without opening the device, whereby the temperature to which the milk is subjected may be readily controlled and whereby both the milk treating and the water jacketing surfaces may be readily and thoroughly cleaned. Further and more detailed objects and advantages of my invention will later appear in this specification.

In the two sheets of drawings accompanying this application and forming a part hereof Figure 1 is a partial end elevation and partial vertical section through my device;

Fig. 2 is a longitudinal vertical section taken on the line M—N of Fig. 1;

Fig. 3 is a horizontal section taken on the line X—X of Fig. 1 looking in a downward direction;

Fig. 4 is a bottom plan view of the receptacle portion of my device;

Fig. 5 is a transverse vertical section through a modified form of treating chamber or base; and Fig. 6 is an elevation illustrating the manner of use of a pair of my devices as a combined pasteurizer and cooler.

Referring to the drawings, in which like characters of reference designate like parts in the several views, 10 indicates the receptacle into which the milk to be treated is poured. This receptacle is provided with a cover 11, closely fitting the same, in which there is preferably a straining well 12 provided with top and side openings through which milk may be introduced, these openings being furnished, respectively, with covers 13, 14. The bottom of the receptacle 10 is preferably slightly arched from the longitudinal center line, as shown in Fig. 1, and adjacent the longitudinal edges there are provided a plurality of small openings 16 which are adapted to deliver the contents of the receptacle 10 into the treating chamber in a series of fine streams. Means are provided for shutting off the flow from the receptacle as desired, these means consisting in the present instance of a pair of plates 17 beveled at their ends, as shown in Fig. 4, and guided in similarly inclined ways 15. To each plate 17 there is attached a link 18, these links being secured at their other ends to opposite sides of a pivoted disk 19 which carries beveled gear teeth on its upper surface. A shaft 20, having bearings carried by the bottom of the receptacle 10, projects to the front of the machine and is provided on its outer end with a knurled knob 21 and carries at its inner end a beveled gear 22 which is in engagement with the corresponding gear on the disk 19. From the above description of parts it will be evident that when the knob 21 is turned it will serve to rotate the disk 19 which, through the links 18, will simultaneously move outwardly or retract the plates 17, thus closing or opening the openings 16 as desired.

The milk receptacle 10 just described is supported on a heat-transferring base 23 which comprises a pair of corrugated or riffled surfaces 24 down which the milk is allowed to trickle and on the opposite side of which there is provided space for a heating or cooling medium, depending on whether the device is to be employed for pasteurizing or cooling milk. The riffles 24 may be conveniently made, as illustrated in Fig. 1, of a single sheet of metal corrugated to give a surface over which the milk will travel slowly and having its bottom portion 25 somewhat inclined toward the front so that the milk will be ultimately discharged through a spigot 26. This strip of metal, the sides of which are soldered to the ends of the base 23, may also be conveniently supported, as illustrated in Fig. 1, by rods or angles 27 suitably mounted adjacent each end thereof within the base portion 23. Adjacent each of the lower front corners of the base 23 there are provided inlet cocks 28 through which heating or cooling water may be admitted into the interior of 23 back of the surface 24; and outlet passages 29 are similarly provided adjacent the upper rear corners of the base. Preferably adjacent the middle lower portion of the base there may also be provided a perforated pipe 30 controlled by a valve 31 through which steam or very hot water may be admitted as required to maintain the temperature of the water at the desired height during the use of the device as a pasteurizer. The temperature of the water in the water jacket may be conveniently observed during either cooling or pasteurizing by means of the thermometer 32 which has its bulb within the interior of the water jacket but which reads from the exterior thereof.

A number of additional openings, closed by screw plugs 33, are preferably provided adjacent the bottoms of the base 23 for the purpose of permitting thorough flushing out of the interior of 23 to remove any sediment which may be deposited therein by the water.

In both the front and rear of the base 23 and within the triangle above the riffles 24 I provide a transparent section 34, preferably of glass, and conveniently held in ways 35 formed by turning up a flange of the metal of which the front of base 23 is made.

In Fig. 5 I have illustrated a modified form of base in which a plurality of riffled surfaces are provided for the purpose of increasing the capacity of the device.

I preferably provide the spigot 26 with an opening 36, properly provided with a closure, through which a thermometer may be conveniently inserted to determine the exact temperature of the milk as it issues from the device.

The manner of using my device will be apparent from the foregoing description of its parts. The milk to be treated is delivered into the receptacle 10 through the well 12, where it is properly strained through the screen which forms the bottom and sides of the well. From the receptacle 10 the milk passes in small streams through the openings 16 and trickles down over the corrugations or riffles on the surface 24, where it is exposed to the heating or cooling action of the fluid on the other side of the riffles. If the treatment be cooling, water at a low temperature may be admitted through the cocks 28 from whence it will circulate through the device and pass out through the openings 29. If more pronounced cooling than the temperature of the water will afford is desired ice may be introduced through the openings in the top of the base 23 which are protected by closures 37. The thermometer 32 will show the temperature of the cooling medium and a thermometer introduced through the opening 36 will give the temperature of the issuing milk.

If the device is to be employed as a pasteurizer, heated water, circulated by pumps or the like, may be introduced through the cocks 28 and withdrawn through the openings 29. If the temperature of this water is lowered below the pasteurizing point, steam or more highly heated water may be introduced through the pipe 30 (under control of the valve 31) until the temperature of the water jacket shall have reached the proper degree as indicated by the thermometer 32.

In Fig. 6 there is illustrated a use of two of my devices in combination; the upper device A being employed as a pasteurizer discharging directly into the container 10 of the lower device B which is for chilling the milk. In this use the spigot 26 is introduced into the lateral opening of the well 12, the closure 14 being swung out of place to permit this connection.

One of the principal advantages of my device arises from the simplicity and thoroughness with which all its surfaces may be cleaned, although the milk during treatment is perfectly protected from contamination by insects or dust. In cleaning the device the parts 10 and 23 are separated and the receptacle 10 may be thoroughly cleansed and aired by removal of the cover 11. The portions of the surface 24 which have been exposed to the milk may be thoroughly cleaned by cleansing fluid introduced through the open top and in addition brushing devices may be introduced through either end in a direction parallel with the corrugations by simply lifting the glass plates 34 out of place. Furthermore these surfaces 24 may be thoroughly aired and even exposed to the action of sunlight—an advantage impossible with any closed milk treating device with which I am familiar.

The considerable number of openings in the water jacket portion of 23 provide ready access thereto for the removal of sediment or incrustations deposited from the water. This is also a marked advantage since certain types of constructions now on the market are after a time rendered valueless by deposits from the water which cannot be removed.

Having thus described my invention, what I claim and desire to secure by Letters-Patent is:

1. In a device for treating milk, a treating chamber having inwardly sloping sides, means for introducing and distributing milk adjacent the upper edges of said sides, a water jacket around said chamber, means for circulating a heating medium through said jacket, and means for introducing a supply of more highly heated medium into said water jacket.

2. In a device for treating milk, a treating chamber having an open top, inwardly sloping sides and open ends, means for closing said top having milk introducing apertures therein, removable transparent means for closing said ends, and means for circulating heating or cooling medium around the exterior of said chamber.

3. In a device for treating milk, a base comprising a treating chamber and a water jacketed space on the sides of said chamber, said water jacketed space being provided with a plurality of openings having removable closures therefor, whereby ready access may be had to said water jacket for cleaning the same.

4. In a device for treating milk, a milk receptacle rectangular in shape, said receptacle having a plurality of small openings in its bottom adjacent each longitudinal side thereof, a cover for said receptacle having a screened well therein, a base, an open topped treating chamber in said base triangular in transverse section and rectangular in longitudinal section, said receptacle being adapted to rest in said chamber and close the top of the same, discharge means for said chamber adjacent its bottom, removable ends for said chamber, and a water jacket in said base at each side of and below said chamber.

5. In a device for treating milk, a receptacle having discharge openings in the bottom thereof, a cover for said receptacle, and a screened well carried by said cover, said well being provided with means whereby liquid may be introduced either through the top or side of said well as desired.

In testimony whereof I hereunto affix my signature.

HENRY M. KESSLER.

Copies of this patent may be obtained for five cents each, by addressing the "Commissioner of Patents, Washington, D. C."